Nov. 2, 1937.  S. GETMANSKY  2,097,877

HAT FASTENING DEVICE

Filed July 23, 1937

INVENTOR
SAMUEL GETMANSKY
BY
ATTORNEY

Patented Nov. 2, 1937

2,097,877

UNITED STATES PATENT OFFICE 2,097,877

HAT FASTENING DEVICE

Samuel Getmansky, New York, N. Y.

Application July 23, 1937, Serial No. 155,165

10 Claims. (Cl. 24—143)

This invention relates to new and useful improvements in a hat fastening elastic device.

The invention has for an object the construction of a device as mentioned which is characterized by a particular advantage in the pin elements thereof.

The invention contemplates constructing a pin element for a hat fastening device which is characterized by a sheet material longitudinal strip having a point at one end, a tail portion at the other end, a circular tubular portion by which said pin element is attached on said elastic, and a certain construction of said tubular portion by which the rigidity of the pin element is increased and the holding ability of the central tubular portion is enhanced.

There are numerous means for securing the pin elements on the ends of the elastic cords in hat fastening devices, as for example, see the patent to A. Solosko, No. 2,081,683, issued on May 25, 1937. But in these prior arrangements sight was lost of the fact that in order for the securing means to be commercially desirable they must not reduce the rigidity of the pin elements, since a reduction in rigidity automatically reduces the holding ability of the securing means. The application of deep recesses in the pin elements reduces their rigidity.

More specifically, the invention contemplates constructing said tubular portion to have one side convexly curved longitudinally thereof and to have the other side also convexly curved longitudinally thereof but of a smaller curvature than the first mentioned side so as to form parallel ribs along the longitudinal edges of the tubular portion. These ribs serve to stiffen the tubular portion which is necessary and desirable in that if the tubular portion is flexible its ability to hold onto the elastic cord is poor. Another feature gained by the use of parallel ribs is that they assist in clamping the end portion of the elastic cord and so further assist in the grip of the pin element on the elastic cord.

The invention contemplates to so arrange the parallel ribs longitudinally of the central tubular portion that they may be located anywhere around the compass of the pin element. For example, on the top or the bottom, or the sides.

Still further it is proposed to form the central tubular portion by bending edge portions of the sheet material. When thus formed, the provision of the parallel ribs previously mentioned greatly facilitate the clamping and holding action required of the tubular portion to grip the elastic cord.

The invention also contemplates a modified arrangement by which it is possible to obtain the same efficient action of simultaneously stiffening the central tubular portion and utilizing the stiffening means to assist in gripping the elastic cord.

Another object of the invention is the construction of a device as described which is simple and durable in operation and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
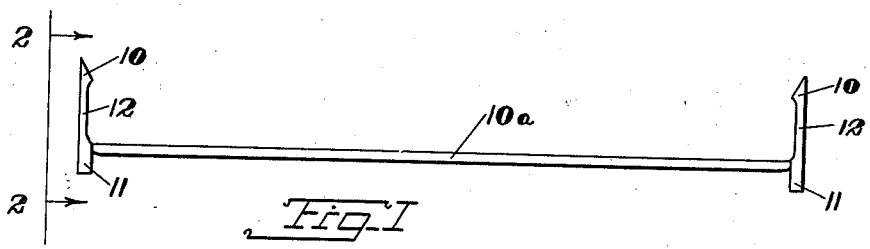
Fig. 1 is a side elevational view of a hat fastening elastic device with the pin elements thereof constructed according to this invention.

In Fig. 1 a hat fastening device is illustrated which comprises an elastic cord 10a upon the ends of which there are pin elements. This invention resides in the particular construction of these pin elements. According to this invention each pin element comprises a sheet material longitudinal strip of metal having a point

10 at one end, a tail portion 11 at the other end, and a central tubular portion 12 by which said pin element is attached on said elastic cord 10a. Pin elements having this general combination of parts are old. The feature of this invention resides in the construction of the tubular portion 12 of the pin element. According to this invention this tubular portion has one side 12a convexly curved longitudinally of the pin element, and the other side 12b also convexly curved longitudinally of the pin element but of a smaller curvature than the first mentioned side 12a, thus forming a pair of spaced parallel ribs 14 extending along the edges of the circular tubular portion. These parallel ribs serve a dual purpose. First, they serve to stiffen the tubular portion 12. Second, they assist in contracting the tubular portion to better grip the elastic cord, and further, side portions of the elastic cord will be clamped in by each of the ribs 14, which is an additional aid in holding the grip of the pin element on the elastic cord.

The tubular portion 12 is formed by coiling together the edge portion of the longitudinal sheet metal strip used in making the pin element. The edges of the tubular portion are indicated on the drawing by the reference numeral 12'. The convexly curved sides of the tubular portion are arranged so that the parallel ribs 14 are on the side opposed to the slit 12'.

Figure 7:
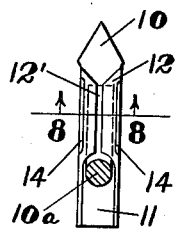
Fig. 7 is an elevational view similar to Fig. 3 but illustrating another modification of the invention.
Figure 8:
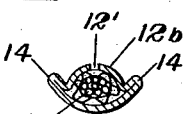
Fig. 8 is a sectional view taken on the line 8—8 of Fig. 7.

In Figs. 7 and 8 another embodiment of the invention has been disclosed in which the rib portions 14 are arranged on the side of the pin element which has the slit 12'.

Figure 2:
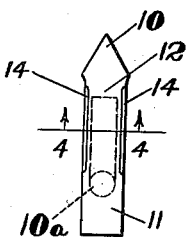
Fig. 2 is an enlarged end view of Fig. 1 looking in the direction of the line 2—2 thereof.
Figure 3:
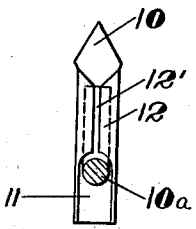
Fig. 3 is a rear elevational view of Fig. 2, showing the elastic cord in section.
Figure 5:
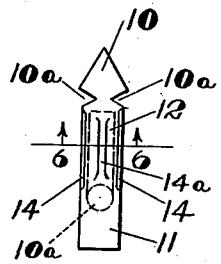
Fig. 5 is an elevational view similar to Fig. 2 but illustrating another embodiment of the invention.
Figure 4:
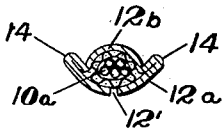
Fig. 4 is a transverse enlarged sectional view taken on the line 4—4 of Fig. 2.
Figure 6:
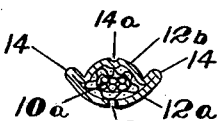
Fig. 6 is a sectional view taken on the line 6—6 of Fig. 5.

In Figs. 5 and 6 another embodiment of the invention has been disclosed which is very similar to the form shown in Figs. 2 to 4, distinguishing merely in the provision of a third rib 14a parallel to the ribs 14 and arranged intermediate of them. This third rib 14a is formed by bulging the material along the longitudinal center of the pin element opposed to the direction in which the metal has been bulged to form the ribs 14. This third rib further assists in increasing the rigidity of the tubular portion and further assists in digging into the elastic cord and so increasing the grip of the pin element on the cord.

In this form of the invention an arrangement is shown by which the point 10 may be easily removed. This arrangement comprises in forming the junction of the point 10 with the tubular body, with side niches or cut-out portions 10a. These niches or cutout portions reduce the area at the junction so that the point 10 may be easily cut off with a scissors or broken off by twisting it backwards and forwards.

Attention is called to the fact that the ribs which reinforce the tubular portion are longitudinally of the tubular portion. This is important since when longitudinally of the tubular portion they may extend a substantial distance along the length of the elastic cord which is being gripped. If transversely of the tubular portion this would not be possible, and furthermore they would not properly reinforce the tubular portion. By providing a long contact between the ribs and the elastic cord the gripping of the cord will be so great that it is practically impossible to pull the pin element off the cord.

Figure 9:
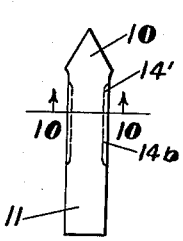
Fig. 9 is another view similar to Fig. 2 but illustrating still another modified form of the invention.
Figure 10:
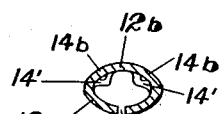
Fig. 10 is a sectional view taken on the line 10—10 of Fig. 9, illustrated with the elastic cord removed so that the details of construction are more readily viewable.

In Figs. 9 and 10 another modification of the invention has been disclosed which is very similar to the form shown in Figs. 2-4 inclusive, distinguishing merely in the fact that the ribs 14' are not continuous, but are interrupted by blank or unribbed areas 14b. This arrangement is inferior to the prior arrangements and is merely illustrated to show the possibilities of variation.

Figure 11:
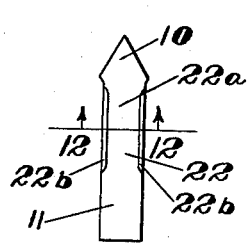
Fig. 11 is another view similar to Fig. 2 but illustrating a still further modification.
Figure 12:
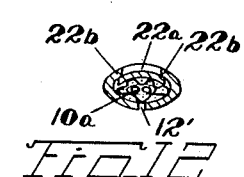
Fig. 12 is a sectional view taken on the line 12—12 of Fig. 11.

In Figs. 11 and 12 another modification of the invention has been disclosed illustrating another method of reinforcing the tubular portion longitudinally thereof and utilizing the reinforcing element or parts to assist in gripping the pin element on the elastic cord. According to this form of the invention the tubular portion 22 has a longitudinal area 22a divided off by longitudinally extending slits 22b. The area 22a is forced inwards to assist in clamping upon the elastic cord and the material of the tubular portion 22a above the edges of the portion 22a and forced towards each other over the edges of the portion 22a. With this arrangement the tubular portion is reinforced longitudinally of its length by the fact that there are overlapping areas of material. Furthermore, because of the depressed portion 22a, and because of the engagement of the edge portions over the depressed portion 22a it is possible to more tightly clamp the tubular portion upon the elastic cord. In other respects this form of the invention is similar to the previous forms and similar parts may be identified by corresponding reference numerals.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:—

1. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord.

2. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord, said tubular portion having a slit along one side thereof extending from end to end.

3. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord, said tubular portion having a slit along one side thereof extending from end to end, said parallel ribs being arranged on the slit side of said tubular portion.

4. In a hat fastening elastic device, a pin element attached on one end of an elastic cord and comprising a sheet metal longitudinal strip having a point at one end, a tail portion at the other end, and a central tubular portion by which said element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord, said tubular portion having a slit along one side thereof extending from end to end, said parallel ribs being arranged on the side opposed to the slit of said tubular portion.

5. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord, and said tubular portion having another rib parallel to and between said ribs.

6. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord, and said tubular portion having another rib parallel to and between said ribs, said additional rib being formed in the opposite direction of the face of the tubular portion to which said first pair of ribs are formed.

7. In a hat fastening elastic device, a pin element attached on one end of an elastic cord and comprising a sheet metal longitudinal strip having a point at one end, a tail portion at the other end, and a central tubular portion by which said pin element is attached on said elastic, and said central tubular portion having one side convexly curved longitudinally thereof and the other side also convexly curved longitudinally thereof but of a smaller curvature than the first mentioned side forming parallel ribs along the edges for reinforcing and stiffening said central tubular portion and for gripping said elastic cord.

8. In a hat fastening elastic device, a pin element attached on one end of an elastic cord, and comprising a sheet metal longitudinal strip having a point at one end, a tail portion at the other end, and a central tubular portion by which said pin element is attached on said elastic, said central tubular portion having on one side a pair of spaced slits longitudinally of the pin elements, the material between said slits being extended inwards to further assist in gripping said elastic cord, and the edge portions of the slit opposed to the portion extended inwards being extended over the edges thereof to double the material along these parts and so reinforce and stiffen said tubular portion.

9. In a hat fastening elastic device, a pin element attached on one end of an elastic cord and comprising a sheet metal longitudinal strip having a point at one end, a tail portion at the other end, and a central tubular portion by which said pin element is attached on said elastic, said central tubular portion being formed with a plurality of rib portions pressed in from the material thereof and serving to stiffen the walls of the tubular portion and also to grip said elastic cord.

10. In a hat fastening elastic device, a pin element attached on one end of an elastic cord and comprising a sheet metal longitudinal strip having a point at one end, a tail portion at the other end, and a central tubular portion by which said pin element is attached on said elastic, said central tubular portion being formed with a plurality of rib portions pressed in from the material thereof and serving to stiffen the walls of the tubular portion and also to grip said elastic cord, said rib portions being parallel.

SAMUEL GETMANSKY.